United States Patent [19]
Pederson

[11] Patent Number: 5,523,902
[45] Date of Patent: *Jun. 4, 1996

[54] SERVO BURST PATTERN FOR REMOVING OFFSET CAUSED BY MAGNETIC DISTORTION AND METHOD ASSOCIATED THEREWITH

[75] Inventor: Richard J. Pederson, Boulder, Colo.

[73] Assignee: Syquest Technology, Inc., Fremont, Calif.

[*] Notice: The term of this patent shall not extend beyond the expiration date of Pat. No. 5,4000,201.

[21] Appl. No.: 330,268

[22] Filed: Oct. 26, 1994

Related U.S. Application Data

[63] Continuation-in-part of Ser. No. 143,214, Oct. 25, 1993, Pat. No. 5,400,201.

[51] Int. Cl.⁶ .................................. G11B 5/596
[52] U.S. Cl. .................. 360/77.080; 360/78.140; 360/48
[58] Field of Search ................ 360/77.01, 77.02, 360/77.05, 77.08, 78.04, 78.14, 135, 48

[56] References Cited

U.S. PATENT DOCUMENTS

| | | |
|---|---|---|
| 3,185,972 | 5/1965 | Sippel et al. . |
| 3,534,344 | 10/1970 | Santana . |
| 3,812,533 | 5/1974 | Kimura . |
| 4,027,338 | 5/1977 | Kril . |
| 4,087,843 | 5/1978 | Louis et al. . |
| 4,163,265 | 7/1979 | van Herk et al. . |
| 4,238,809 | 12/1980 | Fujiki et al. . |
| 4,380,034 | 4/1983 | Krake . |
| 4,424,543 | 1/1984 | Lewis et al. . |
| 4,524,398 | 6/1985 | Fujiki . |
| 4,530,020 | 7/1985 | Sutton . |
| 4,613,915 | 9/1986 | Crouse et al. . |
| 4,669,004 | 5/1987 | Moon et al. . |
| 4,812,929 | 3/1989 | Stewart et al. . |
| 4,814,909 | 3/1989 | Brown et al. . |
| 4,823,212 | 4/1989 | Knowles et al. . |
| 4,890,172 | 12/1989 | Watt et al. . |
| 4,920,462 | 4/1990 | Couse et al. . |
| 4,987,355 | 1/1991 | Leaper et al. . |
| 5,041,926 | 8/1991 | Ockerse et al. ............... 360/77.05 |
| 5,105,318 | 4/1992 | Tsuneta et al. . |
| 5,117,408 | 5/1992 | Weispfenning et al. . |
| 5,170,299 | 12/1992 | Moon . |
| 5,184,257 | 2/1993 | Koga et al. . |
| 5,185,681 | 2/1993 | Volz et al. . |

OTHER PUBLICATIONS

Declaration of Kai C. K. Sun re: Microscience 3½ inch Supra disk drive (Model No. 8040).

*Primary Examiner*—Aristotelis M. Psitos
*Assistant Examiner*—James L. Habermehl
*Attorney, Agent, or Firm*—Lyon & Lyon

[57] ABSTRACT

An alternating "A/B" servo burst pattern for measuring and compensating for offset of the track centerline due to differential magnetic influence to the servo pattern, and a switching network to alternate the output of the servo system demodulators between the inverting and non-inverting terminals of a differential amplifier so that electrical distortion is minimized.

10 Claims, 5 Drawing Sheets

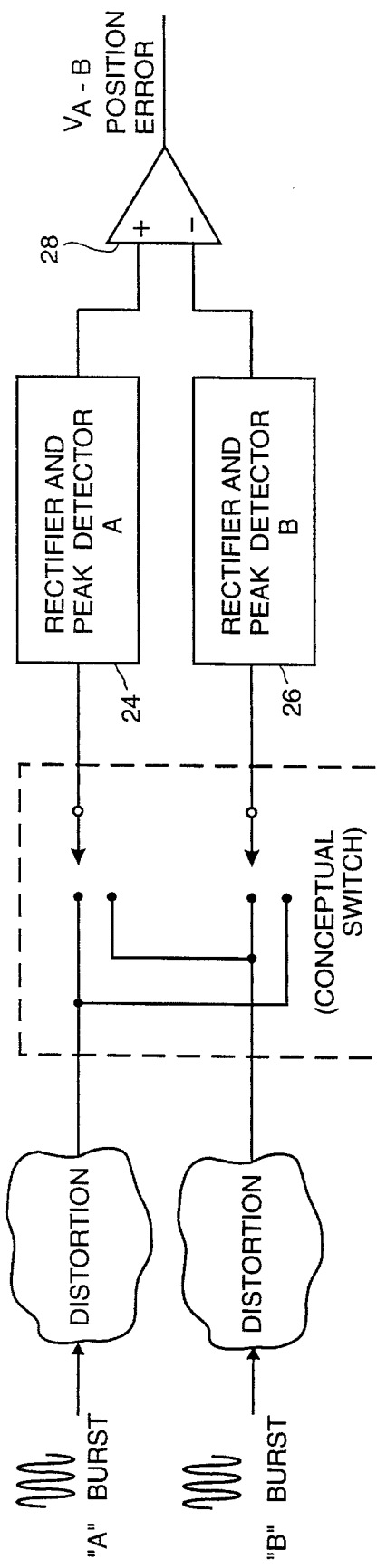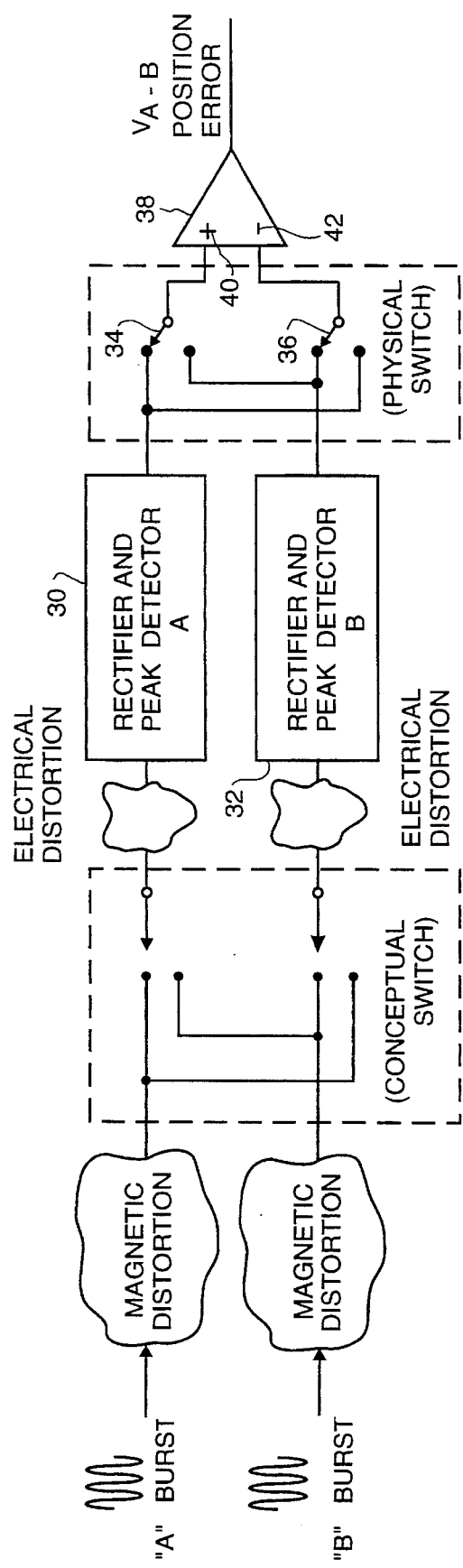
FIG. 4
FIG. 6

SERVO BURST PATTERN FOR REMOVING OFFSET CAUSED BY MAGNETIC DISTORTION AND METHOD ASSOCIATED THEREWITH

This is a continuation-in-part of U.S. patent application Ser. No. 08/143,214, filed Oct. 25, 1993, now U.S. Pat. No. 5,400,201.

TECHNICAL FIELD

The present invention generally relates to servo methods useful for performing read/write head position offset correction in a rotating data storage apparatus. More specifically, the present invention comprises a unique pattern for servo bursts recorded on the surface of a magnetic disk in a disk drive system.

BACKGROUND ART

Control of the read/write head position in a disk drive relative to track centerline on the disk is necessary to insure accuracy of disk drive read and write operations. Over the years, many types of servo systems have been devised to detect and correct the alignment between the read/write head and the track centerline. One type of disk drive servo system is known as a sampled servo system. In such a system, which is characteristically closed-loop or track-following, servo information in the form of magnetic burst patterns is recorded in one or more servo sectors on each track on the surface of the disk.

This servo information is read by the read/write head during servo operations at each servo sector and is used to generate position error signals as a function of the misalignment between the head and the disk track centerline. The position error signals are input through a microprocessor which in turn performs appropriate calculations with the position error signals and outputs servo compensation signals which control the disk drive head positioning mechanism to place the read/write heads over track centerline.

One well known type of sampled servo system involves recording groups or bursts of magnetic transitions radially displaced from each other in the servo sector. These bursts are typically designated as the "A" burst and "B" burst. Due to the radial displacement of the "A" burst relative to the "B" burst in a given servo sector, the "A" and "B" bursts are displaced on either side of the track centerline. When the head is positioned exactly over track centerline, approximately one-half of the "A" burst will be read followed by one-half of the "B" burst in a time displaced fashion. As the head moves off the centerline of a track, the amplitude of one burst decreases while the amplitude of the other burst increases depending on the direction of misalignment. In this manner, a position error signal can be derived from the relative amplitudes of the bursts by rectifying and peak detecting the readout from the head as it passes over the "A" and "B" bursts, and determining the difference in amplitude between the bursts.

A significant problem not adequately addressed by prior art "A/B" servo systems is how to eliminate the effect of magnetic distortion on the "A" and "B" bursts caused by neighboring flux transitions. One type of commercial disk drive product attempts to address this problem by recording the "A" and "B" bursts in an alternating pattern. Specifically, the prior art drive uses a sector servo approach for track following, wherein "A/B" burst patterns alternate with "B/A" burst patterns from servo sector to servo sector throughout the data tracks. The A–B burst differentials measured for each servo sector in the data track being followed are used to generate position error signals indicative of misalignment between the transducer heads in the drive and data track centerline. As a result of reversing the burst patterns from sector to sector in the drive, offsets otherwise present in the A–B burst differentials due to magnetic distortion tend to average out over the course of an entire disk revolution.

The position error signals generated by the prior art alternating servo pattern drive are not in and of themselves compensated for magnetic distortion. Rather, individual position error signals generated at each servo sector are distorted in one direction or the other relative to track centerline, in effect creating a tendency for the heads to "dither" about track centerline. As long as the servo system bandwidth is sufficiently small, the dithering tendency experienced in a disk drive employing the prior art alternating servo approach to eliminating the effects of magnetic distortion may not produce noticeable proturbations as the data transducer follows track centerline. Servo systems with larger bandwidths, however, may experience problems. In addition, electrical distortion in the servo system can introduce further offsets in the position error signal which prior art disk drives do not compensate for. It would therefore be of great benefit to sectored servo disk drives if a means for eliminating the effects of magnetic distortion on the "A" and "B" bursts can be devised.

SUMMARY OF THE INVENTION

The present invention is directed to an apparatus and method for removing undesirable magnetic and electrical offsets from the servo positioning system in a disk drive. In disk drive servo positioning systems, offset and/or gain variations in the magnetic transitions of the servo bursts or electronic offsets in the demodulation process (e.g., peak detection) can cause tracks to be "squeezed" together from their nominal valves as shown in FIG. 1C.

Further, in the removable disk servo sector positioning systems where the data may be written with one set of electronics and read/write heads and may be read with another set of electronics and read/write heads, a write to read positioning offset can be generated by differences in electronic or magnetic offset.

Accordingly, it is an object of the present invention to provide a means to eliminate the effects of magnetic and electrical offsets in the servo positioning system. In one aspect of the present invention, a method of calibrating and correcting for magnetic and electrical offset is disclosed. One or more special calibration tracks are created using an alternating servo pattern of "A" and "B" bursts, whereby the "A/B" burst pattern is changed to a "B/A" burst pattern in alternating servo sectors. The average of the position error signals for the odd numbered servo sectors is subtracted from the average of the position error signals for even numbered servo sectors and then divided by two to obtain the offset error. The error signals may be summed and averaged over one or preferably several disk revolutions. This offset signal is then subtracted from the servo position error signal so as to obtain a servo system substantially free of magnetic and electrical offset. In another separate aspect of the present invention, the outputs of the servo system demodulators (e.g., peak detectors) are switched every servo sector between the inverting and non-inverting terminals of a differential amplifier so as to cancel out electronic offset.

BRIEF DESCRIPTION OF THE DRAWINGS

The various objects, features and advantages of the present invention will be better understood by examining the descriptive Best Mode for Carrying out the Invention found below, together with the attached Drawings, wherein:

FIG. 4 is a conceptual representation of the switching effect of the alternating servo pattern of the present invention;

FIG. 6 shows a preferred embodiment of the present invention wherein in addition to the alternating servo pattern the output of the demodulators (e.g. peak detectors) is switched between alternating terminals of an amplifier every servo sector by an electronic switch.

BEST MODE FOR CARRYING OUT THE INVENTION

Figure 1A:
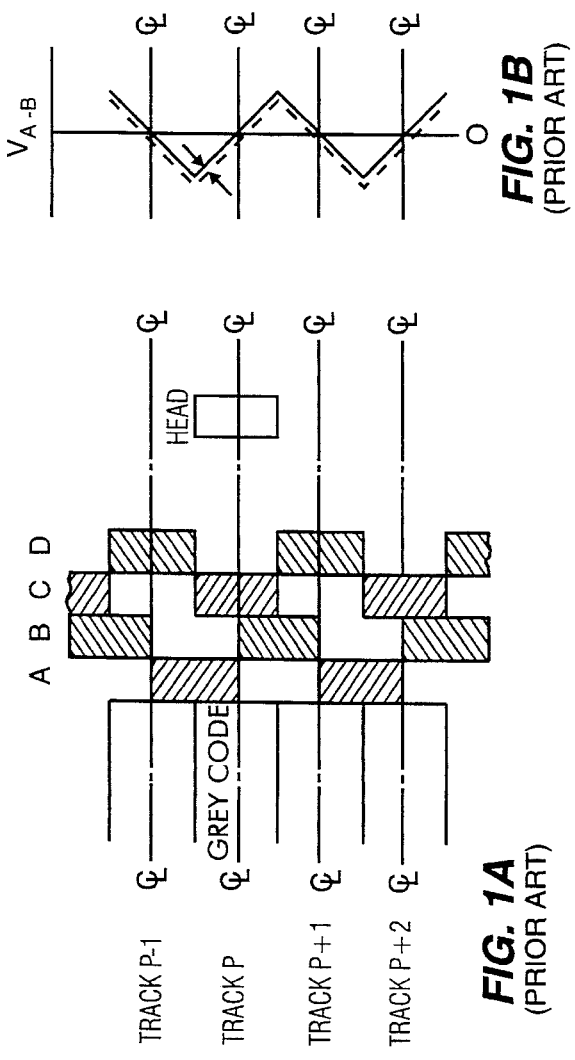
FIGS. 1A–1C represent a prior art sampled servo system wherein magnetic distortion causes the track centerline to be offset from the nominal track centerline with the resultant "squeeze" effect on adjacent tracks.

FIG. 1A illustrates an "A/B" burst pattern typically employed in a sector servo disk drive. The "A" and "B" bursts are followed in each servo sector by "C" and "D" bursts arranged in quadrature fashion, as is well known to those of ordinary skill in the art. The quadrature burst scheme enables track crossings to be detected when the head of the disk drive moves from track to track.

The accuracy of the position error signal, that is, the degree to which the position error signal thus derived truly represents the actual misalignment between the head and track centerline is a function of magnetic matching between the "A" and "B" bursts. That is, the influence of surrounding magnetic patterns can cause distortions in the signal obtained from the read/write head as it reads the "A" and "B" bursts during servo operation. As shown in FIG. 1A, the "A" burst is specifically influenced by the magnetic transitions of the GREY code on one side and the magnetic transitions which make up the "B" burst on the other side. Similarly, the "B" burst is magnetically influenced by its surrounding neighbors consisting of the "A" burst on the one side and the so-called "C" burst used for generating quadrature information on the other side.

Figure 1B:
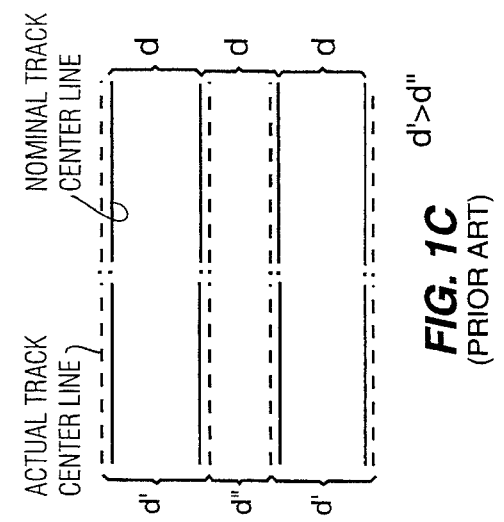

Because the "A" burst is surrounded by a different magnetic environment than the "B" burst, the "A" burst signal that is read by the read/write head is distorted in a slightly different fashion than the "B" burst signal read by the head. This differential distortion skews the difference signal obtained by comparing the "A" burst with the "B" burst, which in turn impairs the ability of the servo system to precisely measure the extent of misalignment between the head and track centerlines. FIG. 1B shows the offset (represented by the difference between the dotted line and the solid line) to nominal track centerline created by the differential magnetic distortion of the servo pattern.

Figure 1C:
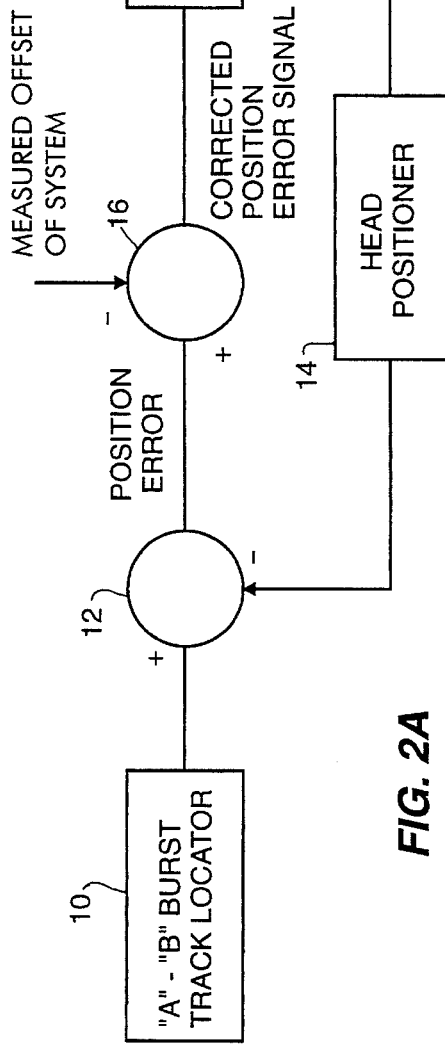

As the disk drive art advances and track density, measured in tracks per inch (TPI), continues to increase, the actual track boundaries are pushed closer and closer together. This increasing track density causes the ability to accurately determine head-to-track misalignment to become all the more important. However, the differential distortion caused by the differences in magnetic environment surrounding the "A" burst relative to the "B" burst in an "A/B" burst servo pattern arrangement tends to create overlap or "squeeze" between adjacent tracks as is shown in FIG. 1C, wherein distance d' is greater than distance d". It is therefore highly desirable to provide a means for eliminating the offset introduced by magnetic distortion of the "A/B" burst pattern.

Figure 2A:
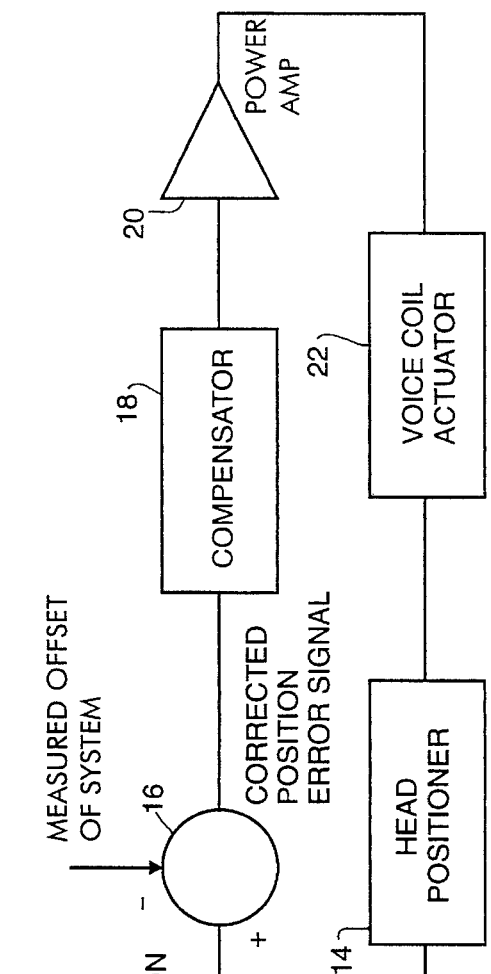
FIG. 2A is a schematic block diagram of the closed loop servo position error correction system of the present invention.
Figure 2B:
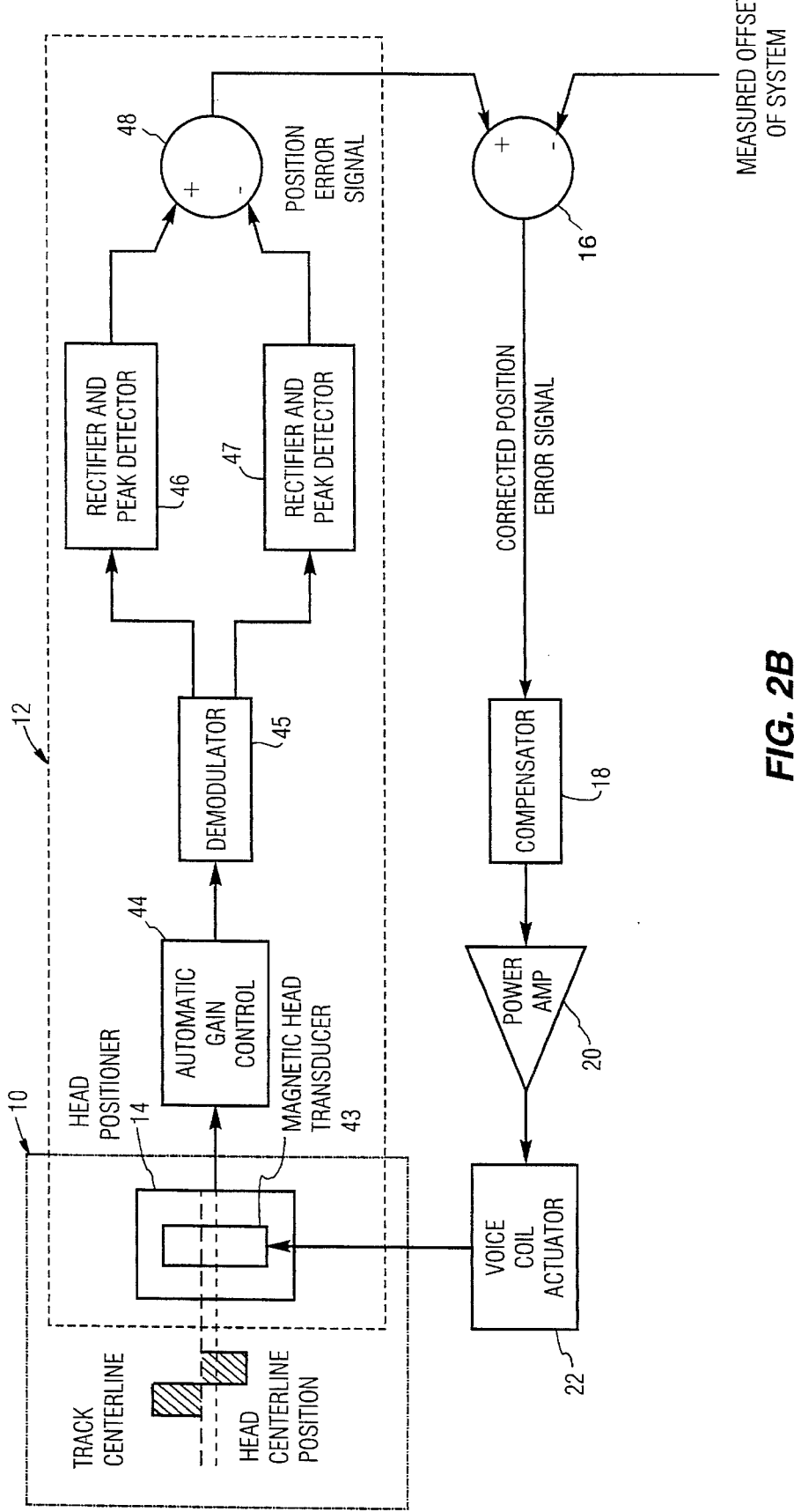
FIG. 2B is a diagram of a preferred embodiment of the closed loop servo position error correction system of FIG. 2A.

FIG. 2A and FIG. 2B illustrate the closed loop design of the servo system employed in the present invention to enhance the accuracy of read/write operations in a disk drive by subtracting position error offset out of the system. In FIG. 2A, "A/B" burst track locator 10 and summing junction 12, whose constituent components are well known in the art and are shown in greater detail in FIG. 2B, generate a position error signal that represents the physical position error of magnetic head transducer 43 of head positioner 14. "A/B" burst track locator 10, as is understood by those of ordinary skill in the art, conceptually comprises the magnetic head transducer 43 of the drive, together with the "A" and "B" bursts on the track, as shown in both FIG. 2A and FIG. 2B.

As a result of the interaction between transducer 43 and the "A" and "B" bursts, transducer 43 generates an output signal which represents the location of the transducer relative to the "A" and "B" bursts, i.e., which represents the "output" of the "A/B" burst track locator. Again as understood by those of ordinary skill in the art, the signal from transducer 43 is processed in peak detection circuitry to generate an A–B burst differential. The A–B burst differential serves as a position error signal indicative of the misalignment between transducer 43 and track centerline. The position error signal is an algebraic function of the actual transducer output from head 43, generated under the influence of the servo feedback signal which the servo system of the present invention applies to head positioner 14 for the purpose of bringing head 43 into alignment with actual track centerline. The generation of the position error signal is conceptually represented by summing junction 12 in FIG. 2A.

The constituent components of summing junction 12 are well known to those of ordinary skill in the art, and include head 43 and its related output signal generated from the "A" and "B" bursts, automatic gain control circuit (AGC) 44, demodulator 5, full wave rectifier and peak detector 46, full wave rectifier and peak detector 47, and difference junction 48.

The voice coil actuator 22 shown in FIGS. 2B and 2B is preferably a rotary actuator and generates a position signal to control the movement of magnetic head transducer 43. Head transducer 43 of head positioner 14 outputs signals representative of the information being read off the track. The output signals from head transducer 43 are sent to AGC 44, where the voltage of the signals is increased to a normalized level. AGC 44 provides the normalized signals to demodulator 45. Demodulator 45 selects in time either the "A" burst signal or the "B" burst signal from the normalized signals and sends the selected burst signal to an appropriate peak detector.

Specifically, demodulator 45 sends the burst signal which occurs first in time to full wave rectifier and peak detector 46 and the burst signal which occurs second in time to full wave rectifier and peak detector 47. Each of the peak detectors 46 and 47 rectifies the incoming sinusoidal burst signal from demodulator 45 by flipping those portions of the signal having a negative amplitude. In other words, the amplitude of every portion of the "A" burst signal and "B" burst signal is made positive. Each peak detector 46 and 47 detects the peak of each rectified burst signal and provides the peak voltage to difference junction 48, which may comprise a difference amplifier. Junction 48 subtracts the peak-detected burst signal input to its negative terminal from the peak-detected burst signal input to its positive terminal.

Optimally, head transducer 43 flies over the track centerline and thus reads an equal amount of the "A" burst and the "B" burst. In this ideal condition, the peak voltages received by difference junction 48 will be equal, and hence, difference junction 48 (and junction 12) will output a zero-valued physical position error signal. However, when the head transducer is off the track centerline, i.e., the head transducer flies over more of one of the "A" or "B" burst than the other, the output off full wave rectifier and peak detector circuit 46 differs from the output of full wave rectifier and peak detector circuit 47. As a result, summing junction 12 outputs a non-zero signal which represents the actual physical position error of head transducer 43. This position error signal generated by summing junction 12 is provided to the positive terminal of junction 16, which may comprise a difference amplifier.

The measured offset of the system, the calculation of which will be explained herein, is transmitted to the negative terminal of junction 16 so that the measured offset of the system is subtracted from the position error signal to produce a position error signal corrected for offset as shown in FIG. 2A and FIG. 2B. Junction 16 sends this corrected position error signal to compensator 18. Compensator 18 may further comprise an analog-to-digital converter to convert the analog corrected position error signal into a digital signal, a microprocessor to use the digital signal to determine how much to move the head transducer 43, and a digital-to-analog converter to convert the digital signal output from the microprocessor back into an analog signal. The analog signal generated by compensator 18 is then amplified by amplifier 20 and sent to mover 22 (e.g., voice coil actuator) which in turn controls the movement of head transducer 43. In this manner, a closed loop servo system for repositioning the head to the track centerline is maintained. Such servo processing techniques are well known to those of ordinary skill in the art, and thus are not described further.

Figure 3:
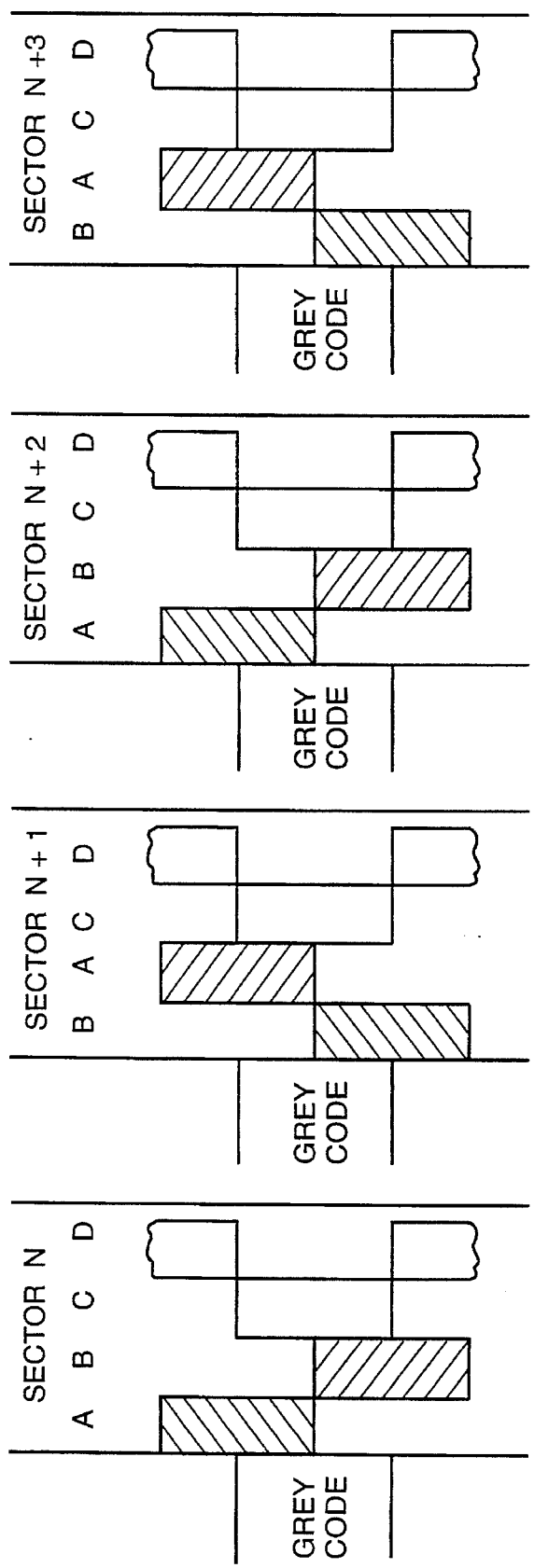
FIG. 3 shows the alternating pattern of "A" and "B" bursts arranged in servo sectors according to the present invention.

In order to cancel out the offset from nominal track centerline caused by differential magnetic distortion to the "A" burst relative to the "B" burst, an alternating sequence of "A/B" bursts is utilized as shown in FIG. 3A.

In servo sector N, the "A" burst is neighbored on the left by the GREY code and on the right by the "B" burst. The "B" burst in servo sector N is neighbored on the left by the "A" burst and on the right by the "C" burst, which is shown as present in the track in FIG. 3A. The "A" burst is located above the track centerline while the "B" burst is located below it. The "D" bursts in quadrature relation with the "C" bursts border on the boundaries of the track illustrated in FIG. 3A, it being understood that on either the immediately preceding or succeeding track the "D" bursts would be present in the track and the "C" bursts would border on the track boundaries.

In servo sector N+1, the next servo sector circumferentially located on the track, the position of the "A" burst relative to the "B" burst is switched so that the "B" burst is neighbored on the left by the GREY code and on the right by the "A" burst, while the "A" burst is neighbored on the left by the "B" burst and on the right by the "C" burst. As in servo sector N, the "A" burst is located above track centerline and the "B" burst below track centerline.

This alternating pattern created by switching the position of the "A" burst relative to the "B" burst in consecutive servo sectors is repeated for all the remaining servo sectors on a given track. In a preferred embodiment each track has 60 servo sectors.

A conceptual representation of the function performed by alternating the relative positions of the "A" and "B" bursts in consecutive servo sectors is shown by the switching network in FIG. 4.

In FIG. 4, the "A" burst encounters distortion due to the magnetic flux generated by its surrounding neighbors. This distorted "A" burst then passes into rectifier and peak detector A 24 where its amplitude is measured. The output of rectifier and peak detector A 24 is connected to the positive terminal of differential amplifier 28. Similarly, the "B" burst is magnetically distorted (in a different amount from the "A" burst creating track offset) by its surrounding neighbors and passed into rectifier and peak detector B 26. The output of rectifier and peak detector B 26 is connected to the negative terminal of differential amplifier 28. Differential amplifier 28 generates an output signal $V_{A-B}$, i.e., the position error signal.

At every servo sector, the conceptual switch is switched such that the distorted "A" burst and the distorted "B" burst pass alternately into rectifier and peak detector B 26 and rectifier and peak detector A 24. In this manner, the amplitudes, as measured by the peak detectors after rectification, of the "A" and "B" bursts alternate between the positive and negative terminals of the differential amplifier 28 from servo sector to servo sector. Thus, the output of differential amplifier 28 ($V_{A-B}$), will alternate in polarity every servo sector.

Figure 5:
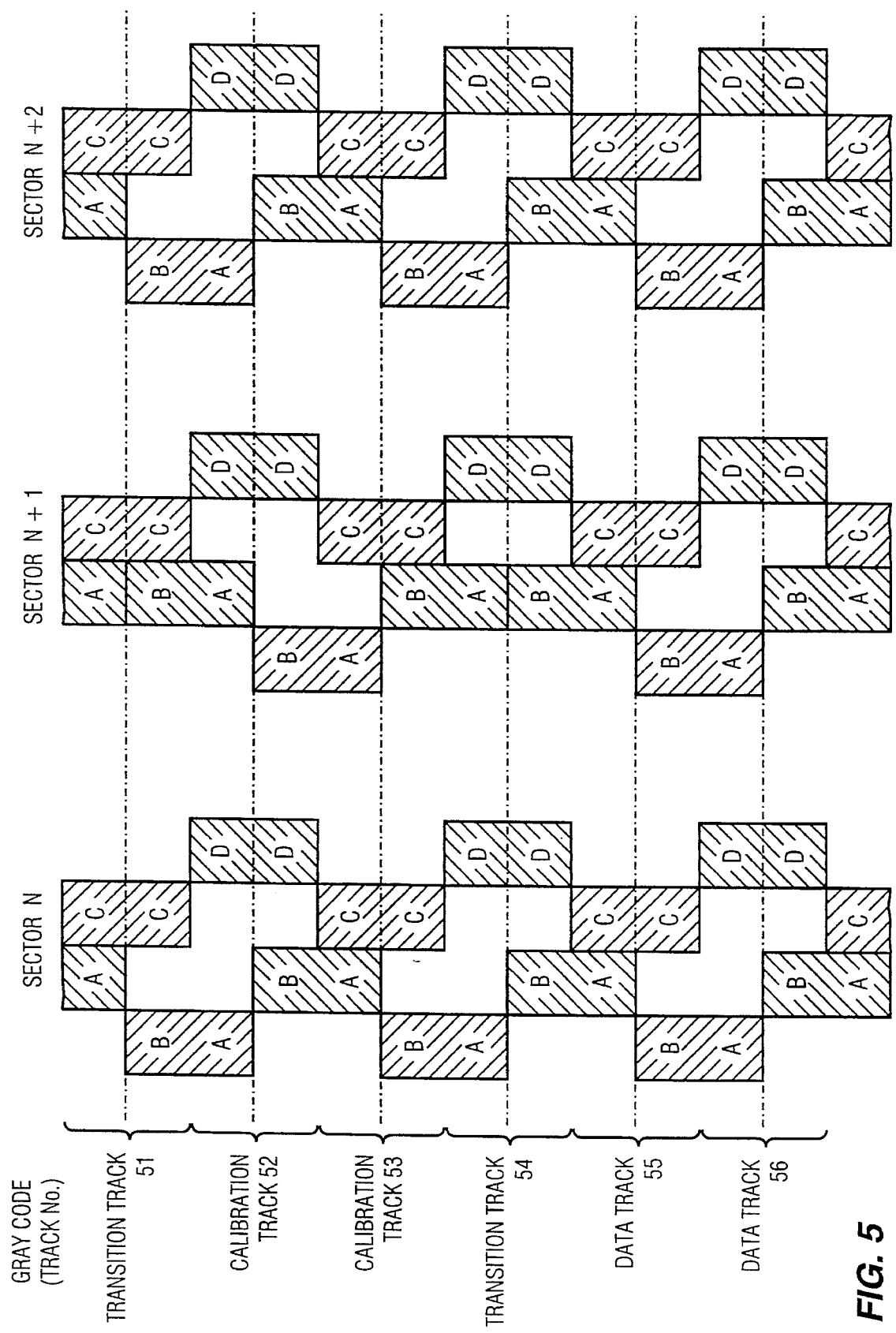
FIG. 5 shows the pattern of servo bursts in calibration tracks, data tracks and transition tracks in a preferred embodiment of the present invention.

In one embodiment of the present invention, mathematical calibration routine may be performed during initialization of the disk drive to compensate for the measured offset of the system from the nominal or ideal track centerline. Several special servo tracks encoded with the above described alternating servo pattern, shown in greater detail in FIG. 5, are utilized with this mathematical calibration routine. These special servo tracks, also called calibration tracks, are identified by GREY CODE as track numbers 52 and 53 in FIG. 5. Representative data tracks are numbered 55 and 56, while track nos. 51 and 54 are so-called "transition tracks" which will be described shortly.

Although FIG. 5 depicts only two calibration tracks, any number of calibration tracks may be present, where all, or any subset, of the calibration tracks may be used. Additionally, the calibration track or tracks may exist at multiple locations on the disk, as desired. For example, as the density of tracks increases, negligible current effects and other distortions may become significant so that additional calibration tracks may become desirable. Thus, calibration tracks which are preferably located near the outer diameter of the disk of the present embodiment may be placed near the inner diameter of the disk as well as other locations on the disk.

As seen in FIG. 5, the "A" and "B" servo pattern in the calibration tracks 55 and 56 alternate from servo sector to servo sector. That is, servo sectors with "A/B" burst patterns alternate with servo sectors containing "B/A" burst patterns in circumferential fashion around each of the calibration tracks. This alternating pattern of calibration track servo bursts is used to generate an offset value during disk drive initialization, as will be described below. Meanwhile, the "A" and "B" bursts in the servo sectors of the data tracks, e.g., tracks 55 and 56, are recorded in a non-alternating pattern around the data tracks. The "C" and "D" quadrature bursts are recorded in non-alternating patterns for both the calibration track servo sectors and the data track servo sectors.

The calibration tracks transition to data tracks via transition tracks. For example, FIG. 5 shows transition track 54 lying between calibration track 53 and data track 55. Another transition track, track 51, lies between guard band track 50 and calibration track 52.

During one or preferably several revolutions of the disk, all the position error values for even numbered sectors are summed (accumulated), and all the position error values for the odd sectors are summed. At the end of the revolution or preferably several revolutions, the summed position error values are averaged for even and odd sectors. The average of the odd sector error is then subtracted from the averaged even sector error. The result is then divided by 2 to obtain the offset due to the magnetic distortion influencing the "A" and "B" bursts.

Mathematically, the operation can be represented by the equation:

$$\text{Offset} = \frac{1}{2} \left[ \frac{\frac{\Sigma X_{2n}}{S \cdot R}}{2} - \frac{\frac{\Sigma X_{2n+1}}{S \cdot R}}{2} \right]$$

where $x_{2n}$ is the position error signal for even numbered servo sectors;

$X_{2n+1}$ is the position error signal for odd numbered servo sectors;

S=the total number of servo sectors which is equal to 60 in a preferred embodiment;

n=0, 1, 2, . . . 29 in a preferred embodiment; and

R is equal to the number of revolutions of the disk the operation is performed over. In a preferred embodiment, R>1.

The offset obtained by performing the above calculation is then subtracted out of the position error signal as shown in FIG. 2A and FIG. 2B at junction 16. In this manner, a corrected position error signal is obtained so that the read/write head flies over the centerline of the track. Once measured during initialization, the measured offset correction signal is maintained as a constant during disk drive operations to continuously compensate for the system offset. The measured offset value is not re-calculated until the disk drive is reinitialized.

In addition to correcting for offset to the position error signal caused by magnetic distortion, a switching circuit may be employed to alternately switch the outputs of demodulators (e.g. peak detectors) between the inverting and non-inverting terminals of an amplifier as shown in FIG. 6. FIG. 6 shows the same conceptual switch to represent the switching effect of the alternating servo pattern as was shown in FIG. 4. In FIG. 6 electrical distortion is generated by the differences in peak detector paths, which influences the output of rectifier and peak detectors A and B 30 and 32 in a differential manner creating a corresponding and undesirable electronic offset. At every servo sector, the rectifier and peak detectors 30 and 32 are switched or "swapped" by switches 34 and 36 so that the output of the rectifier and peak detector A is alternated between non-inverting amplifier terminal 40 and inverting amplifier terminal 42. Similarly, the output of rectifier and peak detector B 32 is switched between the inverting amplifier terminal 42 and the non-inverting amplifier terminal 40. When the output of rectifier and peak detector A 30 is applied to non-inverting terminal 40, the output of rectifier and peak detector B 32 is applied to inverting terminal 42. At the next servo sector the outputs of rectifier and peak detectors A and B 30 and 32 are switched so that the output of rectifier and peak detector A 30 is applied to the inverting terminal 42 and the output of rectifier and peak detector B 32 is connected to non-inverting terminal 40. This alternating sequence continues for every servo sector on a given track. Switches 34 and 36 are preferably transistors.

While the invention is susceptible to various modifications and alternative forms, specific examples thereof have been shown by way of example in the drawings and are herein described in detail. It should be understood, however, that it is not intended to limit the invention to the particular forms disclosed, but on the contrary, the invention is to cover all modifications, equivalents, and alternatives falling within the spirit and scope of the invention as defined by the following claims.

What is claimed is:

1. A disk drive track following system for keeping a data transducer head on track, said system comprising:

a magnetic recording disk with a plurality of concentrically spaced data tracks and at least one concentrically spaced calibration track, said data tracks including a plurality of circumferentially disposed data track servo sectors arranged for periodic sampling, each of said data track servo sectors having recorded therein data track servo information in the form of servo bursts arranged in quadrature fashion, said data tracks also including GREY code preceding said data track servo sectors;

said calibration track including a plurality of circumferentially disposed first calibration track servo sectors and a plurality of circumferentially disposed second calibration track servo sectors arranged for periodic sampling, said first calibration track servo sectors alternating with and spaced at predetermined distances from said second calibration track servo sectors, said calibration track also including GREY code preceding said first calibration track servo sectors and said second calibration track servo sectors, said first calibration track servo sectors and said second calibration track servo sectors having recorded therein calibration track servo information in the form of an alternating pattern of A bursts radially displaced outwardly from the centerline of said calibration track and B bursts radially displaced inwardly from the centerline of said calibration track, each of said first calibration track servo sectors specifically having recorded therein a single one of said A bursts following said GREY code and a single one of said B bursts following said single A burst, each of said second calibration track servo sectors specifically having recorded therein a single one of said B bursts following said GREY code and a single one of said A bursts following said single B burst;

said track following system also comprising a head positioner supporting the data transducer, a mechanical mover connected to said head positioner, and detection circuitry connected to said mechanical mover, said detection circuitry including circuit components which detect said servo bursts in said data track servo sectors on said data tracks and generate position error signals in response thereto, said position error signals representing the displacement between the data transducer and the centerline of the data tracks, said detection circuitry also including a means for generating an offset value from the detected amplitudes of said A bursts and said B bursts in said first and second calibration track servo sectors, said offset value representing the amount of offset present in said position error signals due to distortion, said detection circuitry also including means for subtracting said offset value from said position error signals to compensate for the effects of distortion.

2. The track following system of claim 1, wherein said magnetic recording disk further has at least one transition track separating said calibration track and said plurality of concentrically spaced data tracks, said transition track including a plurality of circumferentially disposed transition track servo sectors which transition between said alternating pattern of A and B bursts recorded in said first and second calibration track servo sectors and said data track servo information recorded in said data track servo sectors.

3. The track following system of claim 1 wherein said magnetic storage disk is removable.

4. The track following system of claim 1 wherein said circuit components include peak detectors which detect said servo bursts in said data track servo sectors and which also detect the amplitudes of said A bursts and said B bursts in said first and second calibration track servo sectors.

5. The track following system of claim 4, wherein said circuit components include an amplifier.

6. The track following system of claim 5, wherein said amplifier is a differential amplifier with inverting and non-inverting terminals connected to said peak detectors.

7. A magnetic recording disk suitable for use in a disk drive with a sampled servo system, said magnetic recording disk comprising:

a plurality of concentrically spaced data tracks, said data tracks including a plurality of circumferentially disposed data track servo sectors arranged for periodic sampling, said data track servo sectors having recorded therein data track servo information in the form of a non-alternating pattern of A bursts radially displaced outwardly from the centerline of said data tracks, B bursts radially displaced inwardly from the centerline of said data tracks and C bursts and D bursts positioned in quadrature fashion relative to said A bursts and said B bursts, the spatial relationship between said A bursts, said B bursts, said C bursts and said D bursts in said data track servo sectors remaining constant for all of said data track servo sectors on any given data track, said data tracks also including GREY code preceding said data track servo sectors; and at least one concentrically spaced calibration track including a plurality of circumferentially disposed first calibration track servo sectors and a plurality of circumferentially disposed second calibration track servo sectors arranged for periodic sampling, said first calibration track servo sectors alternating with and spaced at predetermined distances from said second calibration track servo sectors, said calibration track also including GREY code preceding said first calibration track servo sectors and said second calibration track servo sectors, said first calibration track servo sectors and said second calibration track servo sectors having recorded therein calibration track servo information in the form of a partially alternating pattern of A bursts radially displaced outwardly from the centerline of said calibration track, B bursts radially displaced inwardly from the centerline of said calibration track, and C bursts and D bursts positioned in quadrature fashion relative to said A bursts and said B bursts, each of said first calibration track servo sectors specifically having recorded therein a single one of said A bursts followed by a single one of said B bursts followed by a quadrature arrangement of said C and D bursts, each of said second calibration track servo sectors specifically having recorded therein a single one of said B bursts followed by a single one of said A bursts followed by a quadrature arrangement of said C and D bursts, the spatial relationship between said C and D bursts remaining constant for every one of said first and second calibration track servo sectors on each of said calibration tracks.

8. A magnetic recording disk as set forth in claim 7, wherein said disk is removable relative to the disk drive.

9. A magnetic recording disk suitable for use in a disk drive with a sampled servo system, said magnetic recording disk comprising:

a plurality of concentrically spaced data tracks, said data tracks including a plurality of circumferentially disposed data track servo sectors arranged for periodic sampling, said data track servo sectors having recorded therein data track centerline information in the form of a non-alternating pattern of A bursts radially displaced outwardly from the centerline of said data tracks and B bursts radially displaced inwardly from the centerline of said data tracks, the spatial relationship between said A bursts and said B bursts in said data track servo sectors remaining constant for all of said data track servo sectors on any given data track, said data tracks also including GREY code preceding said data track servo sectors; and at least one concentrically spaced calibration track including a plurality of circumferentially disposed first calibration track servo sectors and a plurality of circumferentially disposed second calibration track servo sectors arranged for periodic sampling, said first calibration track servo sectors alternating with and spaced at predetermined distances from said second calibration track servo sectors, said calibration track also including GREY code preceding said first calibration track servo sectors and said second calibration track servo sectors, said first calibration track servo sectors and said second calibration track servo sectors having recorded therein calibration track centerline information in the form of an alternating pattern of A bursts radially displaced outwardly from the centerline of said calibration track and B bursts radially displaced inwardly from the centerline of said calibration track, each of said first calibration track servo sectors specifically having recorded therein at least one of said A bursts following said GREY code and at least one of said B bursts following said A burst, each of said second calibration track servo sectors specifically having recorded therein at least one of said B bursts following said GREY code and at least one of said A bursts following said B burst.

10. A magnetic recording disk as set forth in claim 9, further comprising at least one transition track separating said calibration track and said plurality of concentrically spaced data tracks, said transition track including a plurality of circumferentially disposed transition track servo sectors which transition between said alternating pattern of A and B bursts recorded in said first and second calibration track servo sectors and said non-alternating pattern of A and B bursts recorded in said data track servo sectors.

* * * * *